United States Patent [19]

Baudouin et al.

[11] 4,353,751

[45] Oct. 12, 1982

[54] METHOD TO PRODUCE MINERAL FILLERS CONTAINING HYDRATED CALCIUM MONOCARBOALUMINATE

[75] Inventors: Jacques Baudouin; Jean-Pierre Caspar, both of Viviers; Jacques Gaillard, Villeneuve de Berg, all of France

[73] Assignee: Lafarge, Paris, France

[21] Appl. No.: 210,543

[22] Filed: Nov. 26, 1980

[30] Foreign Application Priority Data

Nov. 30, 1979 [FR] France .............................. 79 29534

[51] Int. Cl.$^3$ .......................................... C04B 31/40
[52] U.S. Cl. .................................. 106/306; 106/309; 423/600
[58] Field of Search ................. 106/306, 309; 423/600

[56] References Cited

U.S. PATENT DOCUMENTS

| | | | |
|---|---|---|---|
| 2,636,830 | 4/1953 | Wall | 106/306 |
| 2,958,626 | 11/1960 | Schenck et al. | 423/600 X |
| 3,494,731 | 2/1970 | Reynolds | 106/306 X |
| 4,238,458 | 12/1980 | Misra | 423/600 X |

*Primary Examiner*—Carl F. Dees
*Attorney, Agent, or Firm*—Frost & Jacobs

[57] ABSTRACT

A method of producing mineral fillers containing hydrated calcium monocarboaluminate.

$Al(OH)_3$, $CaCO_3$ and $Ca(OH)_2$ are reacted together in the presence of water, the operating temperature range being of 50° C.–100° C. Although these materials are insoluble, a quick reaction occurs as well in a highly concentrated solid medium as in a diluted medium. According to a preferred embodiment, the amount of water is such to obtain a final dry matter content of 50%, and the substantially solid resulting paste is directly brought to the fluidity required for use by means of a deflocculating agent.

Application to paper coating.

10 Claims, No Drawings

METHOD TO PRODUCE MINERAL FILLERS CONTAINING HYDRATED CALCIUM MONOCARBOALUMINATE

The present invention relates to a method of producing mineral fillers containing hydrated calcium monocarboaluminate.

Hydrated calcium monocarboaluminate is a compound having the formula: $3CaO.Al_2O_3.CaCO_3,nH_2O$. The value of n can vary, in particular by drying at high temperature. It is admitted at present that $n=11$ at normal temperature. Said compound is present in small amounts in hydraulic concretes, at the interface between aluminous materials and limy aggregates.

In U.S. Pat. No. 2,636,830, there was described a method of producing said compound on an industrial scale, which consists in reacting, in an aqueous medium, a water-soluble alkaline aluminate such as $NaAlO_2$, calcium hydroxide and either an alkaline metal carbonate or ammonium carbonate, or $CO_2$ gas according to a reaction such as:

$$2NaAlO_2 + 4Ca(OH)_2 + CO_3Na_2 \rightarrow 3CaO.Al_2O_3.CaCO_3,11H_2O + 2NaOH.$$

The hydrated calcium monocarbonaluminate is under the form of hexagonal plaquettes and constitutes a filler which may be used in various industries, and is especially suited for paper coating.

When prepared by the just-described reaction, this product has the drawback of a high cost, due to the use of such raw materials as $NaAlO_2$ which requires removal of the soda in excess, this process being expensive. This drawback will not appear if use is made of $CO_2$, but the equipment will then be more intricate and bulky.

In French Pat. No. 73/37969 issued under No. 2,249,140, there is described another industrial method of producing hydrated calcium monocarboaluminate, consisting in effecting full hydration of aluminocalcium binders, then causing the hydrates formed with $CO_2$ to float in the water. The resulting product is also suitable to be used as a filler, in particular for paper coating, and the cost is reduced, since the aluminocalcium binders, or aluminous cements, are less expensive than the raw materials of the aforesaid U.S. patent.

French Pat. No. 2,161,409 describes a compound of formula: $3CaO.Al_2O_3.Ca(X)_n$, $W\,H_2O$, where X is an anion which can be $CO_3^{--}$. In this patent is also described a method for preparing said compound by reacting, in an aqueous suspension, CaO or $Ca(OH)_2$ with an alumina gel and at least one aluminum or calcium water-soluble salt. In the case where X represents $CO_3^{--}$, since this anion will form no salt with aluminum and will form with $CO_3$ a single compound, i.e. $CO_3Ca$ which is insoluble, the process necessarily requires on the one hand a Ca or Al salt other than a carbonate and, on the other hand, another compound apt to bring in $CO_3^{--}$ ions, this entailing a complication. Said patent gives no example of carrying the invention into effect when X represents $CO_3^{--}$.

In any case, this process is essentially carried out in solution since it requires not only the presence of a Ca or Al soluble salt, but also the use of an alumina gel which is known to undergo very fast dissolution in a calcium hydroxide suspension.

The drawback attending this method when X represents $CO_3^{--}$ lies both in its complication, since it requires four different components and in its cost, since some of said components, especially alumina gel, are expensive.

The object of the present invention is to provide a method of producing mineral fillers consisting mainly of the hydrated calcium monocarboaluminate at a cost still lowered as compared to the prior art, the qualities of the product for the intended purposes being at least substantially retained.

The present invention is based on the unexpected discovery that between the following products, deemed insoluble, viz. crystallized $Al(OH)_3$, calcium carbonate $CaCO_3$ and calcium hydroxide $Ca(OH)_2$, in the presence of water and at a temperature ranging from 50° to 100° C., the following reaction:

$$2Al(OH)_3 + CaCO_3 + 3Ca(OH)_2 + 5H_2O \rightarrow 3CaO.Al_2O_3.CaCO_3,11H_2O.$$

will occur at a rate sufficiently high to be acceptable in industrial practice.

It is unexpected to obtain high rates for this reaction. As a matter of fact, firstly, $CaCO_3$ is known to be among the most insoluble calcium salts, for its solubility in the cold state is only of 13 mg per liter in pure water and, while it is higher in an acid medium, occurrence of the latter is prevented by the presence of $Ca(OH)_2$. Secondly, it is known that crystallized $Al(OH)_3$ will dissolve but at a very low rate in a $Ca(OH)_2$ suspension, this being a difference with the behaviour of alumina gel. As the rate of a series of reactions is usually governed by the slowest reaction, it could be assumed that the reactions would be very slow.

It will be noticed that such is the case in the cold state, where the reaction times reach days or weeks, unless a catalyst is added. The commercially acceptacle rates, corresponding to reaction times of some hours or at most a few ten of hours, are only reached above 50° C., and preferably above 70° C. There is no reliable explanation for this unexpected phenomenon.

The same reaction will occur when calcium is replaced, at least partly, by magnesium. In the present specification, it will be recalled that the word "calcium" may also designate magnesium.

The above reaction proceeds in a dilute medium, but can also be effected in a highly concentrated medium, e.g. having a dry matter content of 60% and more. Of course, in this case, friable solids are obtained, but it was found unexpectedly that the addition of suitable amounts of deflocculating agents will provide, from friable solids, quite fluid slurries which are all the more useful for such applications as coating as their solid matter content is high.

The present invention provides a method of producing mineral fillers containing hydrated calcium monocarboaluminate by reaction of raw material containing $Al_2O_3CaO$ and $CO_2$ in the presence of water, essentially followed by addition of a deflocculating agent to reach the required viscosity, the main feature of said method being that aluminum hydroxide, calcium carbonate and calcium hydroxide are mixed with water in such proportions that the molar ratio $Ca(OH)_2/Al(OH)_3$ is at most of 1.5 and the molar ratio $Ca(OH)_2/CaCO_3$ or $Ca(OH)_2/Ca, Mg)OC_3$ is at most of 3.

Preferably, a deflocculating agent is only added when the hydrated calcium oxide has fully disappeared.

The just-indicated molar ratios express the fact that calcium oxide is an undesirable element in coating slips and in numerous applications for which it is desirable to have a filler of neutral character, without basic reaction. In particular, calcium oxide will consume high amounts of soluble deflocculating polyacrylate, which is thereby changed into insoluble, inefficient calcium polyacrylate. The same effect is noted with the other usual deflocculating formulations in the coating slips for paper, i.e. polyphosphates and/or silicates.

Therefore, a most important point in the reaction control will be to monitor the changing condition of free lime and full removal thereof.

However, it is usual in the paper industry to add as a pigment or filler, in the coating slips, alcaline earth carbonate or alumina hydrate.

Therefore, no difficulty arises, provided that the selected raw materials are by themselves of sufficiently fine size, in providing a mixture containing alumina hydrate and/or lime in high excess with respect to stoechiometry.

As a matter of fact, calcium carbonate is less frequently used as a filler for paper than hydrated calcium monocarboaluminate, since its granule morphology is such as to reduce the gloss of the paper and printing rendition. The same is true of aluminium hydroxide which is a more expensive product.

In practice, said $Ca(OH)_2/Al(OH)_3$ ratio will range from 1.3 to 1.5, while the $Ca(OH)_2/CaCO_3$ or $Ca(OH)_2/(Ca, Mg)CO_3$ ratio may vary in a broader range, e.g. of 1 to 3, but the lower limits set forth here are mainly of economical signification. In particular, there may be provided fillers consisting mainly of $CaCO_3$ with a low proportion of monocarboaluminate.

As concerns the amount of water used, there are two preferred manners of carrying the invention into effect. The former consists in working with a diluted medium, that is with final solid matter contents of 15–35% by weight, then concentrating the resulting slurry by usual technical means such as filtration and/or drying. This procedure allows to use, without any expensive modification, existing plants for producing fillers. According to the second embodiment, the operating medium is highly concentrated, i.e. such that the final dry matter concentration is of 35–70% by weight. The resulting product is then substantially solid but, by addition of a deflocculating agent in sufficient amount, it can be directly brought to such fluidity as is required for its use.

The raw materials used preferably are:

alumine hydrate such as obtained in alumina synthesis by precipitation from soda aluminate solutions, for example. This compound as selected should be clean, pure and fine-sized if a pigment of good quality is to be obtained—example of recommended particle size: 100% of particles of a size lower than 10 microns;

calcium carbonate and/or magnesium carbonate. This may be a natural product, won from quarriers, or a synthetic product—example of recommended particle size: 100% lover than 10 microns;

lime hydrate resulting from limestone calcination example of industrial fineness: less the 60 microns.

It is known that, when stored without special care, lime hydrate will undergo carbonation. Here, this phenomenon is of no great significance; however, it is necessary to analyse the lime hydrate a short while before its use and, when selecting the proportions, to take into account the amount of $Ca(OH)_2$ which has been changed into $CaCO_3$.

The lime hydrate taken into account in the reaction is wholly water-soluble and its fineness is not important.

The above-mentioned reaction will also occur if the calcium is at least in part replaced by magnesium, for example, if the limestone is of dolomitic character. There will then be obtained a composite hydrated calcium and magnesium-monocarboaluminate.

In the present context, it should be understood that the calcium may be replaced, at least in part, by magnesium.

The invention will be explained in more details by means of two examples of embodiment of the method.

EXAMPLE 1

The following components were successively introduced, in the order set forth, in a steel tank provided with a simple stirrer:

| | |
|---|---|
| Water at 80° C. | 60 kg |
| Hydrated lime (size < 60 microns, Elrepho whiteness > 82%) | 48 kg |
| Limestone (size < 10 microns) | 19 kg |
| Hydrated aluminum oxide (size < 10 microns, Elrepho whiteness 94%) | 33 kg |

The hydrated lime contained about 81.5% by weight of $Ca(OH)_2$ and 18.5% of $CaCO_3$. The limestone contained 99% of $CaCO_3$, the difference being impurities. The hydrated aluminum oxide also had a purity of 99%.

The aggregate composition was maintained at a temperature of 70°±10° C. for 24 hours. Stirring was effected during the first three minutes, then the reaction was left to mature during 24 hours. The chemical reaction was easily monitored by means of X ray diffraction, which showed vanishing of lime and limestone and appearance of the lines proper to monocarboaluminate. Diffential thermal analysis allowed quantitative tracing (by comparison) of lime removal.

When the lime was totally reacted, that is after 24 hours, the mixture which had slightly hardened (consistency of a hand-breakable solid) was taken up. The blocks cut therein were fed to a breaking down device with addition of a deflocculating agent of the polyacrylate type, viz. "POLYSEL" of BASF Company, in a dry weight ratio of 0.8% as related by the hydrate formed.

The produced substance was gradually dispersed and it was unexpectedly obtained a highly liquid aqueous slurry, of a 300-cp viscosity, the dry matter content being adjusted to 58% by water addition (the measurement being made after drying at 80° C.).

Examination under an electronic microscope of the scanning type showed that the particles formed are small hexagonal crystals in the shape of tiny plaquettes having flat dimensions of about 0.2 to 3 microns and a thickness equal to about 1/10 or 1/20 of these dimensions.

The particle size courve drawn with a laser-type granulometer shows that:

30% of the particles <1 micron.
60% of the particles <3 microns.

EXAMPLE 2

Using the same raw materials as in Example 1, a mixture was prepared with the following proportions:

| | |
|---|---|
| hydrated lime | 38.4 kg |
| limestone | 35.2 kg |

| | |
|---|---|
| hydrated aluminum oxide | 26.4 kg |

This was heated and stirred during 2 hours at 80° C., then left for 3 hours at 80° C. without stirring. At the end of the 5 hours, hydration was complete.

There was obtained a mixture consisting of 80% of hydrated monocarboaluminate and 20% of calcium carbonate in excess with a dry extract of 25%.

One of the advantages obtained by this procedure (and which would also appear when using alumine hydrate in excess) follows from the following fact: the chemical reaction will wear, by attack and dissolution, the insoluble mineral grains introduced in the reaction water. Consequently, use may be made of a raw limestome markedly more coarse than a limestone recommended for paper industry, since in a 80:20 mixture such as recited, it may be assumed that, on a statitical basis, each limestone grain will undergo 80% erosion. Thus, a limestone merely passing through 10 microns meshes will already provide good coating results.

EXAMPLE 3

The following coating slips were prepared:

| | |
|---|---|
| pigment (dry) | 100 parts |
| starch (dry) | 8 parts |
| polyvinyl acetate latex, as dry | 8 parts |
| water and additive for 500 cm³ | |

As a pigment, a comparative study was made of the following products:

(A) coating China clay of DIA type, (B) 80% of coating China clay and 20% of calcium carbonate, 90% <2 microns, (C) pigment prepared according to Example 1 above, (D) pigment prepared according to Example 2 above.

The resulting coatings slips were used to coat a paper of pure chemical fibres weighing 70 g/m², having a whiteness of 85% and an opacity of 80%. One face receive 10 g/m² deposited coat and, after coating, drying and calendering, the following characteristics were measured:

| | A | B | C | D |
|---|---|---|---|---|
| Whiteness % as compared to the magnesia standard | 87 | 90 | 93 | 94 |
| Opacity % | 90.4 | 91.5 | 91 | 92.4 |
| Gloss as measured under a 60° angle, % | 45 | 40 | 52 | 46 |
| Coat structure observed with 2800 et 3800 inks of Societe LORILHEUX-LEFRANC | | | | |
| Microporosity | closed | open | open | open |
| Macroporosity | none | none | none | none |
| Peeling rate in the dry state 3803 ink of LORILHEUX-LEFRANC in cm/s | 110 | 120 | 105 | 115 |

This example shows the excellent performances of such a pigment, which ranks among the best pigments for paper coating purposes.

We claim:

1. A method for producing mineral fillers containing hydrated calcium monocarboaluminate, said process comprising reacting aluminum hydroxide under crystallized form, calcium oxide or calcium hydroxide and a normal carbonate $CaCO_3$ and/or a double calcium magnesium carbonate, in the presence of water, the operating temperature being higher than 50° C.

2. A method as claimed in claim 1, wherein the operating temperature is in the range of 50° to 100° C.

3. A method according to claim 2, wherein the operating temperature is higher than 70° C.

4. A method according to claim 1, wherein the following molar ratios are used:
$Ca(OH)_2/Al(OH)_3$ at most of 1.5 and
$Ca(OH)_2/CaCO_3$ or $Ca(OH)_2/(Ca,Mg)CO_3$ at most of 3.

5. A method according to claim 4, wherein the $Ca(OH)_2/Al(OH)_3$ ratio is higher than 1.2.

6. A method according to claim 4, wherein the $Ca(OH)_2/CaCO_3$ ratio is higher than 1.

7. A method according to claim 5, wherein the $Ca(OH)_2/CaCO_3$ ratio is higher than 1.

8. A method according to claim 1, wherein the amount of water added is selected to obtain a final product containing 15-35% by weight of solid matter.

9. A method according to claim 1, wherein the amount of water added is selected to obtain a final product containing 35-70% weight of solid matter, and in that a deflocculating agent is added in sufficient amount to obtain such fluidity as is suitable for the intented purpose.

10. A method according to claim 8, wherein the deflocculating agent addition to reach the required viscosity is only effected after complete removal of the hydrated calcium oxide.

* * * * *